United States Patent
Timner et al.

(10) Patent No.: US 9,510,368 B2
(45) Date of Patent: Nov. 29, 2016

(54) METHOD AND ARRANGEMENT FOR ACKNOWLEDGEMENT OF CONTENTION-BASED UPLINK TRANSMISSIONS IN A TELECOMMUNICATION SYSTEM

(75) Inventors: Ylva Timner, Luleå (SE); Anna Larmo, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 161 days.

(21) Appl. No.: 13/996,393

(22) PCT Filed: Dec. 21, 2010

(86) PCT No.: PCT/SE2010/051442
§ 371 (c)(1),
(2), (4) Date: Jun. 20, 2013

(87) PCT Pub. No.: WO2012/087199
PCT Pub. Date: Jun. 28, 2012

(65) Prior Publication Data
US 2013/0279465 A1 Oct. 24, 2013

(51) Int. Cl.
*H04W 74/08* (2009.01)
*H04W 74/00* (2009.01)
(Continued)

(52) U.S. Cl.
CPC ........... *H04W 74/08* (2013.01); *H04W 74/006* (2013.01); *H04W 72/042* (2013.01); *H04W 72/1289* (2013.01); *H04W 74/0833* (2013.01)

(58) Field of Classification Search
CPC ............. H04W 74/006; H04W 74/08; H04W 74/0833
USPC .................................. 370/312, 329, 432, 437
See application file for complete search history.

(56) References Cited

U.S. PATENT DOCUMENTS

2007/0206531 A1* 9/2007 Pajukoski ......... H04W 74/0866
370/329
2007/0277074 A1* 11/2007 Yeo et al. ...................... 714/749
(Continued)

FOREIGN PATENT DOCUMENTS

CN 101715237 A * 5/2010 ........ H04W 74/0833
WO WO 2010/057540 A1 5/2010
(Continued)

OTHER PUBLICATIONS

Ericsson el al., "Contention based uplink transmissions", Jun. 29-Jul. 3, 2009, 3GPP TSG-RAN WG2 66bis, R2-093812, pp. all.*
(Continued)

*Primary Examiner* — Un C Cho
*Assistant Examiner* — Shah Rahman
(74) *Attorney, Agent, or Firm* — Myers Bigel, P.A.

(57) ABSTRACT

A method is provided in a base station for providing feedback to user equipments on reception status of data transmitted by the user equipments. The base station and the user equipments are within a wireless communication system adapted for contention based transmissions. A common identifier is used to identify contention based grants on a physical downlink control channel. Upon successful reception of data from at least one of the plurality of user equipments, dedicated acknowledgement feedback is provided by including an indication of the identity of the at least one user equipment from which data was successfully received in a message to said common identifier on the physical downlink control channel. Related arrangements in a base station, methods in a user equipment, and arrangements in a user equipment are disclosed.

12 Claims, 6 Drawing Sheets

(51) Int. Cl.
*H04W 72/04* (2009.01)
*H04W 72/12* (2009.01)

(56) References Cited

U.S. PATENT DOCUMENTS

| | | | |
|---|---|---|---|
| 2008/0096557 A1* | 4/2008 | Rinne | H04W 8/26 455/435.1 |
| 2008/0139214 A1* | 6/2008 | Sun et al. | 455/450 |
| 2010/0002630 A1* | 1/2010 | Park et al. | 370/328 |
| 2010/0074172 A1* | 3/2010 | Fontaine et al. | 370/328 |
| 2010/0074201 A1* | 3/2010 | Wu | 370/329 |
| 2010/0232363 A1* | 9/2010 | Hsu | H04L 1/0091 370/328 |
| 2011/0128928 A1* | 6/2011 | Lin | H04W 74/0833 370/329 |
| 2011/0243080 A1* | 10/2011 | Chen | H04W 74/0841 370/329 |
| 2012/0044816 A1* | 2/2012 | Ratasuk | H04L 1/1657 370/252 |
| 2012/0269137 A1* | 10/2012 | Kang | H04B 7/0404 370/329 |

FOREIGN PATENT DOCUMENTS

| | | |
|---|---|---|
| WO | WO 2011/037503 A1 | 3/2011 |
| WO | WO 2011/086525 A1 | 7/2011 |

OTHER PUBLICATIONS

Ericsson et al., "Details of latency reduction alternatives", Nov. 9-13, 2009, 3GPP TSG-RAN WG2 #68, R2-096759, pp. all.*
International Search Report, Application No. PCT/SE2010/051442, Apr. 27, 2011.
Written Opinion of the International Searching Authority, Application No. PCT/SE2010/051442, Apr. 27, 2011.
Mediatek et al: "Discussion on the Retransmission of Contention-Based Transmission", 3GPP Draft; R2-100174, 3$^{rd}$ Generation Partnership Project, Mobile Competence Centre; 650, Route Des Lucioles; F-06921 Sophia-Antipolis Cedex; France, vol. RAN WG2, no. Valencia, Spain; Jan. 18, 2010, Jan. 12, 2010, XP050420955.
ETRI: "The handling of CB uplink transmission", 3GPP Draft; R2-101305, 3$^{rd}$ Generation Partnership Project, Mobile Competence Centre; 650, Route Des Lucioles; F-06921 Sophia-Antipolis Cedex; France, vol. RAN WG2, no. San Francisco, USA; Feb. 22, 2010, Feb. 16, 2010, XP050421791.
ZTE: : "Discussion on contention resolution of CB transmission", 3GPP Draft; R2-101101, 3$^{rd}$ Generation Partnership Project, Mobile Competence Centre; 650, Route Des Lucioles; F-06921 Sophia-Antipolis Cedex; France, vol. RAN WG2, no. San Francisco, USA; Feb. 22, 2010, Feb. 14, 2010, XP050421455.
3GPP TS 36.321 V8.4.0 (Dec. 2008); 3$^{rd}$ Generation Partnership Project; "Technical Specification Group Radio Access Network;" Evolved Universal Terrestrial Radio Access (E-UTRA) Medium Access Control (MAC) Protocol specification (Release 8); 43 pages.
Wualcomm Europe, et al.: "Local NACKing Optionality MAC CR" 3GPP TSG-RAN2 Meeting #65 Athens, Greek, Feb. 9-13, 2009; R2-090964; Change Request: 36.321 V8.4.0; 3 pages.

* cited by examiner

METHOD AND ARRANGEMENT FOR ACKNOWLEDGEMENT OF CONTENTION-BASED UPLINK TRANSMISSIONS IN A TELECOMMUNICATION SYSTEM

CROSS REFERENCE TO RELATED APPLICATION

This application is a 35 U.S.C. §371 national stage application of PCT International Application No. PCT/SE2010/051442, filed on 21 Dec. 2010, the disclosure and content of which is incorporated by reference herein in its entirety. The above-referenced PCT International Application was published in the English language as International Publication No. WO 2012/087199 A1 on 28 Jun. 2012.

FIELD OF THE INVENTION

The present invention relates to a method and an arrangement in a base station and a method and an arrangement in a user equipment. In particular, it relates to providing feedback to user equipments concerning the reception status of data received from the user equipments on a contention based grant.

BACKGROUND

In many wireless communication systems, a plurality of user equipments share resources on a common medium for transmission. One option of avoiding resource conflicts is that for example a base station performs a scheduling or allocation of resources to selected user equipments. Dynamic allocation of the resources during operation of the communication network can significantly increase the transmission efficiency so that the resources are not left unused if some of the user equipments have presently no or only a small amount of data to transmit while others require more resources.

Resources may be subdivided into resource blocks which can be allocated individually or in groups. Depending on the transmission technology, a resource block can for example be defined by a frequency range and a time interval in which a device is allowed to transmit data.

In 3rd Generation Partnership Project (3GPP) Long Term Evolution (LTE), the uplink Resource Blocks (RB) are dedicated to users by means of uplink scheduling grants (SG) being transmitted on the Physical Downlink Control Channel (PDCCH). The uplink grants are addressed to the Cell-Radio Network Temporary Identifier (C-RNTI) of the user equipments.

To initiate a transmission, a user equipment requests uplink resources by transmitting a Scheduling Request. In LTE this can be done using the Physical Uplink Control Channel (PUCCH). The radio network, e.g. the Evolved Node B (eNB) controlling the cell where the user equipment is located, selects the resource blocks to be allocated to the user and can select also the uplink transport format, defining parameters associated with the uplink transmission, like e.g. transport block size, physical layer coding, and modulation.

However, the signalling of a scheduling request and scheduling grant before a transmission gives rise to latency and signalling overhead in the communication system and thus reduce the transmission efficiency.

A contention based (CB) transmission scheme has been proposed to improve, i.e. reduce, the latency of the system. The contention based scheme basically comprises broadcasting an uplink grant in the cell to which any uplink time aligned User Equipment (UE), that has data to send may opportunistically respond with a data transmission. For identifying such contention based grants an identifier, currently referred to as Contention Based-Radio Network Temporary Identifier (CB-RNTI), is used on the Physical Downlink Control Channel PDCCH. The available CB-RNTIs in a cell can be either broadcasted in the cell, e.g. to be used for initial access, signaled to each user using dedicated Radio Resource Control (RRC) signaling, e.g. during RRC connection setup, or signalled using an RRC reconfiguration message. The CB-RNTIs may also be specified, e.g. hard-coded in the standard.

In order to improve performance of transmission in the downlink as well as the uplink direction, LTE in non-contention based mode, i.e. contention free mode, uses Hybrid Automatic Repeat Request (HARQ). The basic idea of HARQ, for uplink transmission, is that the eNB, also referred to as the base station, after receiving data in an uplink subframe attempts to decode it and then reports to the user equipment that the decoding was successful by sending an acknowledgement (ACK) or that is was unsuccessful by sending a negative acknowledgement (NACK) on a Physical Hybrid-Automatic Repeat Request (ARQ) Channel, often referred to as PHICH. In the latter case of an unsuccessful decoding attempt, the user equipment thus receives a NACK in a later downlink subframe, and can retransmit the data that was not successfully received at the eNB.

However, in the case of an error in the decoding of a transmission from a user equipment on a contention based grant, the eNB will not be able to determine the identity of the transmitting user equipment, and will therefore not be able to correctly combine retransmissions with transmissions from different user equipments transmitting on the same contention based grant. Thus, according to the concept of contention based transmission, a single grant can be used to signal several contention based allocations. As a consequence, there might be several successful and unsuccessful transmissions based on one single grant. Therefore, one bit ACK/NACK gives very little information that might be wrong feedback for some or most of the users.

SUMMARY

It is therefore an object of the present invention to provide a resource efficient way of providing reception status feedback to user equipments that use a contention based transmission scheme.

A first aspect of an embodiment relates to a method in a base station for providing feedback to user equipments on reception status of data transmitted by the user equipments, said base station and user equipments being comprised in a wireless communication system adapted for contention based transmissions, wherein a common identifier is used to identify contention based grants on a physical downlink control channel. The method comprises the steps of sending a contention based grant to a plurality of user equipments; and upon successful reception of data from at least one of said plurality of user equipments, providing dedicated acknowledgement feedback by including an indication of the identity of said at least one user equipment from which data was successfully received in a message addressed to said common identifier on the physical downlink control channel.

Hereby, dedicated acknowledgement feedback is provided to the one or more user equipments using the contention based grant, from which data was successfully received.

The message in which the dedicated acknowledgement feedback is being comprised may in a particular embodiment be a contention based grant. Said grant may comprise a resource allocation field and at least one acknowledgement, ACK, field. In a particular embodiment said contention based resource grant comprises two or more acknowledgement, ACK, fields.

Alternatively, the message may be a feedback message with no associated grant.

The indication of the identity of said at least one user equipment may in a particular embodiment comprise at least a part of the C-RNTI of said at least one user equipment from which data was successfully received. The identity may be represented in the message by a number of the least significant bits of the C-RNTI of said at least one user equipment from which data was successfully received.

A second aspect of an embodiment relates to an arrangement in a base station adapted to provide feedback to user equipments on reception status of data transmitted by the user equipments, said base station and user equipments being comprised in a wireless communication system adapted for contention based transmissions, wherein a common identifier is used to identify contention based grants on a physical downlink control channel. Said arrangement comprising a processing unit configured to send a contention based grant to a plurality of user equipments; and upon successful reception of data from at least one of said plurality of user equipments, provide dedicated acknowledgement feedback by including an indication of the identity of said at least one user equipment from which data was successfully received in a message addressed to said common identifier on the physical downlink control channel.

A third aspect of an embodiment relates to a method in a user equipment for receiving feedback from a base station on reception status of data transmitted by the user equipment, said base station and user equipment being comprised in a wireless communication system adapted for contention based transmissions, wherein a common identifier is used to identify contention based grants on a physical downlink control channel, the method comprising the steps of receiving a contention based grant transmitted by the base station to a plurality of user equipments;

transmitting data using said contention based grant;

receiving dedicated acknowledgement feedback by detecting an indication of the user equipment's own identity in a message on the physical downlink control channel addressed to said common identifier.

A fourth aspect of an embodiment relates to an arrangement in a user equipment adapted to receive feedback from a base station on reception status of data transmitted by the user equipment, said base station and user equipment being comprised in a wireless communication system adapted for contention based transmissions, wherein a common identifier is used to identify contention based grants on a physical downlink control channel, the arrangement comprising a processing unit configured to receive a contention based grant transmitted by the base station to a plurality of user equipments;

transmit data using said contention based grant;

receive dedicated acknowledgement feedback by detecting an indication of the user equipment's own identity in a message on the physical downlink control channel addressed to said common identifier.

Other objects, advantages and novel features of the invention will become apparent from the following detailed description of the invention when considered in conjunction with the accompanying drawings and claims.

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary details.

Figure 1:
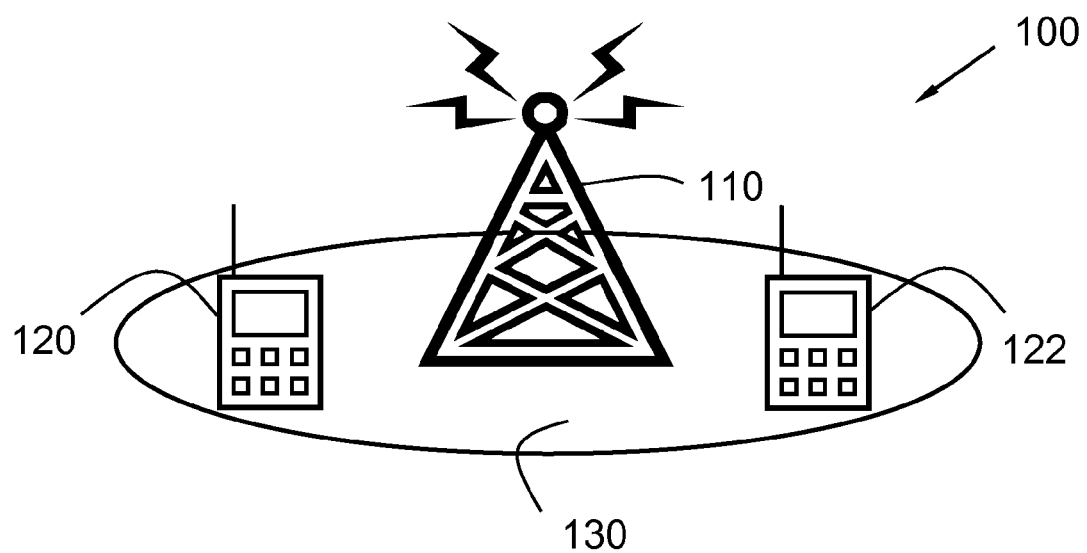
FIG. 1 is a schematic illustration of a wireless communication system.

FIG. 1 depicts a wireless communication system 100, such as e.g. a system according to one of the Evolved UTRAN (E-UTRAN), also referred to as LTE, LTE-Advanced, 3rd Generation Partnership Project (3GPP) WCDMA, Global System for Mobile communications/Enhanced Data rate for GSM Evolution (GSM/EDGE), Wideband Code Division Multiple Access (WCDMA), Worldwide Interoperability for Microwave Access (WiMax), or Ultra Mobile Broadband (UMB), to mention some possible options.

The wireless communication system 100 comprises a base station 110, a first user equipment 120 and a second user equipment 122 adapted to communicate with each other over at least one radio channel, within a cell 130. The wireless communication system 100 is adapted for applying contention based transmission scheme.

The base station 110 may be referred to as e.g. a NodeB, an evolved Node B (eNode B, or eNB), a base transceiver station, Access Point Base Station, base station router, or any other network unit capable to communicate with the user equipment 120, 122 within the cell 130, depending e.g. of the radio access technology and terminology used. In the rest of the description, the term "base station" will be used for the base station 110, in order to facilitate the comprehension of the present methods and arrangements.

The user equipments 120, 122 may be represented by e.g. a wireless communication terminal, a mobile cellular phone, a Personal Digital Assistant (PDA), a wireless platform, a laptop, a computer or any other kind of device capable to communicate wirelessly with the base station 110. Further, the user equipments 120, 122 within the cell 130 may, according to some embodiments be grouped together in subsets of user equipments 120, 122, forming contention based groups.

In the following, the present methods and arrangements are further elaborated with specific reference to LTE systems and more particularly with respect to the uplink in LTE, i.e. for the link from the user equipment 120, 122 towards the base station 110. However, it is obvious to a skilled person that corresponding concepts could also be applied in other wireless communication systems 100 adapted for contention based access. The identifier used for identification of contention based grants will hereafter be referred to as CB-RNTI. However, this terminology should be interpreted as an example. Other terminology may be used for such identifier.

One alternative of providing feedback in a contention based transmission scheme could be to use the PHICH channel just as for Contention Free (CF) access. In this case, the ACK/NACK consists of only one bit, and the allocation of resources is determined based on control channel elements used by the grant. It is therefore a common feedback for all transmissions that used the contention based grant. If the base station detects several transmission attempts, the feedback will be a logical AND of the transmission successes for all transmissions using the same contention based grant. Thus, either all user equipments transmitting on the same contention based grant receive an ACK, or all of said user equipments receive a NACK.

Another alternative would be to realize dedicated feedback, sent as a grant addressed to the C-RNTI, Cell Radio Network Temporary Identifier, of the user equipment, in case the data from that user equipment was correctly received. Since only successful transmissions can be identified, only positive feedback would be signaled. Since the user equipment's own C-RNTI would be used for the dedicated feedback, the normal grant format, i.e. not the contention based grant format, must be used in order to ensure backward compatibility since not all user equipments are capable of using contention based transmission scheme. The current 3GPP standard for LTE states that a user equipment must always respond to a grant. This means that a user equipment that receives a grant as positive feedback, i.e. indicating that data from the user equipment was correctly received, will have to respond to the grant with a dummy-block if the user equipment does not have data to transmit.

Another alternative for dedicated positive feedback would be to send a downlink Medium Access Control (MAC) Packet Data Unit (PDU) including a MAC Control Element (CE) with the C-RNTI of the user equipment from which the contention based transmission was successfully received. The MAC CE has to be scheduled using a downlink scheduling assignment addressed to the C-RNTI of the user equipment, or to the common CB-RNTI. This means that the MAC CE requires a MAC signaling on the Physical Downlink Shared Channel, PDSCH, as well as the scheduling assignment signaled on PDCCH.

The alternative to send a specific MAC control element with the C-RNTI of the user equipment using the CB-RNTI will cause overhead on PDCCH and PDSCH due to scheduling assignment on PDCCH and MAC signaling on PDSCH. Also, if the alternative of using a scheduling grant as acknowledgement feedback with the C-RNTI of the user equipment is used as described in the foregoing, the extra overhead on PDCCH will be large, since the grant is not always needed in case the user equipment does not have data to transmit. In addition, such a grant might be confused with grants sent proactively by the base station when the user equipment is expected to have data to transmit.

According to embodiments of the invention, new message format or formats are defined for signaling dedicated ACK feedback on a physical downlink control channel, in LTE referred to as PDCCH, to user equipments using contention based access. The message comprising the dedicated feedback is addressed to a common identifier that is used to identify contention based grants on a physical downlink control channel, hereinafter referred to as CB-RNTI. This means that legacy user equipments without CB capability can not read the message format addressed to CB-RNTI, and backward compatibility is thus ensured.

Thus, according to embodiments of the invention, dedicated acknowledgement feedback is provided in a message format directly on the physical downlink control channel, e.g. PDCCH. Decoding of such message is fast compared to for example dedicated feedback on a physical downlink shared channel, PDSCH, requiring MAC signaling. This means that the current HARQ Round Trip Time, RTT, can be kept. The dedicated acknowledgement feedback consists of an indication of the identity of one or more user equipments from which a transmission was successfully received at the base station. Successful reception of a transmission means that the base station was able to correctly decode the transmitted data.

The identity of the one or more user equipments with a successful contention based transmission could in a particular embodiment be included as the C-RNTI of the one or more user equipments. Alternatively, in order to save space, only a number of bits of the C-RNTI of said one or more user equipments could be included. Said number of bits could in a particular embodiment be the least significant bits of the C-RNTI.

According to a particular embodiment, the dedicated acknowledgement feedback could be comprised in a contention based grant in order to minimize overhead on PDCCH.

In the embodiment referred to above, where the dedicated acknowledgement feedback is comprised in a contention based grant, an additional contention based grant format that does not include an ACK could be defined in order to signal that there was no data received from any of the user equipments that used the contention based grant. This special format would indicate "no reception" to the user equipments.

Alternatively, a specific value could be reserved for the alternative that no data was received from any user equipment, said reserved value would be used in the message on the physical downlink control channel to said common identifier in the place where the indication of identity of one or more user equipments would have been if successful contention based transmission from at least one user equipment had been received. In this case, it needs to be decided how to treat user equipments with a C-RNTI where the bits representing the identity, for example the least significant bits of the C-RNTI, are the same as said reserved specific value. One way to solve this could be that the base station would avoid assigning such C-RNTIs to user equipments that might use contention based access. An alternative way could be to use another value to signal an ACK to these user equipments.

Figure 2:
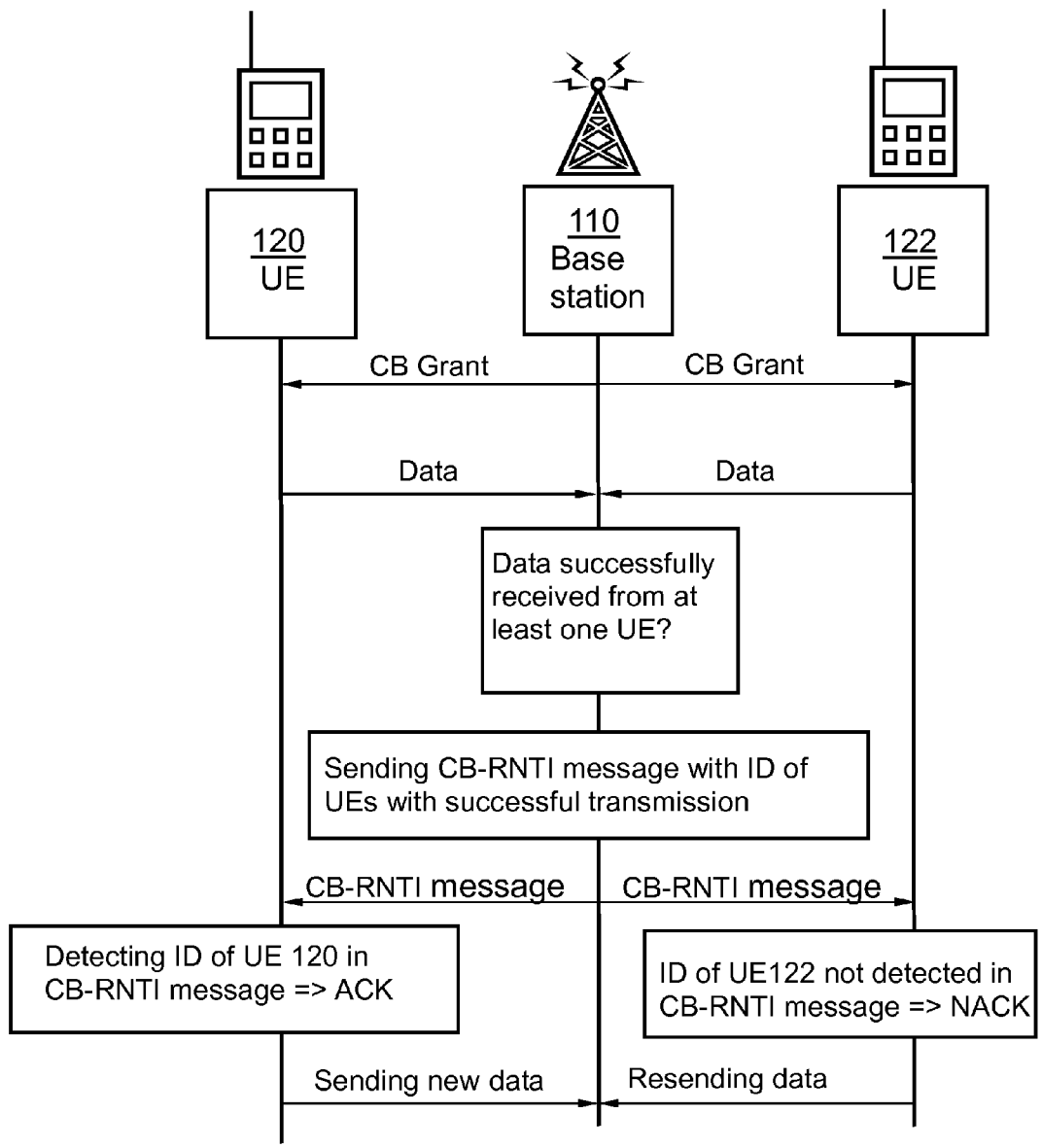
FIG. 2 is a combined signalling and flowchart illustrating radio signal transmission according to some embodiments.

FIG. 2 is a combined signalling and flowchart illustrating radio signal transmission according to some embodiments.

The purpose of this illustration is to provide a general overview of the present methods and the functionalities involved.

In a first step, the base station 110 schedules and sends a contention based grant to a plurality of user equipments 120, 122 within the cell 130. An identifier referred to as CB-RNTI is used for identifying the contention based grant to the user equipments that are capable of using contention based transmission. The contention based grant may be addressed to all user equipments 120, 122 within the cell 130, or sent to a subset of user equipments 120, 122 within the cell 130, i.e. subsets of user equipments 120, 122 forming contention based groups with different CB-RNTIs, according to different embodiments.

Thus any synchronized user equipments 120, 122 capable of using contention based transmission that have uplink data to send but no valid grant can now read this contention based grant and use it to make a contention based data transmission. As a response to the transmitted contention based grant, user equipments 120, 122 that have data to send to the base station 110 may use the contention based grant for sending data according to said grant.

When the base station 110 receives signalling from the user equipments 120, 122, the base station 110 attempts to decode the transmissions from the user equipments and by means of e.g. a Cyclic Redundancy Check (CRC) estimate whether a transport block is correctly received or not.

If it is verified that data is correctly received from at least one user equipments 120, 122, the identity of the at least one user equipment from which data was correctly received is comprised in a message transmitted on the PDCCH using the contention based identifier CB-RNTI.

The user equipments 120, 122 reads the PDCCH, and if a user equipment 120 detects an indication of its own identity in the message on the PDCCH, it interprets this as an acknowledgement of its contention based transmission, and continues with transmission of new data. On the other hand, if user equipment 122 does not detect an indication of its own identity in the PDCCH message, it interprets this absence as a non-acknowledgement, NACK. Thus, in this case, a retransmission usually needs to be performed.

When a user equipment detects that a transmission is unsuccessful it needs to retransmit. The retransmission can be made on either the Medium Access Control, MAC, layer or on the Radio Link Control, RLC, layer. For data that are not acknowledged by the base station, the user equipment may generate a local negative acknowledgement, NACK, to the RLC layer. Thereby the RLC layer may initiate a fast RLC retransmission of the data and provide the RLC retransmission as new data for transmission in the buffer. The invention could also be combined with retransmissions on the MAC layer. In that case, the same radio block is retransmitted on another contention based resource, and the delay can be kept minimal since no repacking is needed.

The MAC layer is situated in the protocol sublayer above the physical layer and below the RLC layer in the LTE protocol stack. The connection to the physical layer below is through transport channels, and the connection to the RLC layer above is through logical channels. The MAC layer may perform data transmission scheduling and multiplexing/demultiplexing between logical channels and transport channels. In the user equipment 120, 122, it may also be responsible for control of random access, timing advance and discontinuous reception.

The RLC layer is located between the Packet Data Convergence Protocol (PDCP) layer and the MAC layer in the LTE user plane protocol stack. The main functions of the RLC layer are segmentation and reassembly of upper layer packets in order to adapt them to the size which can actually be transmitted over the radio interface. For radio bearers which need error-free transmission, the RLC layer also may perform retransmission to recover from packet losses. Additionally, the RLC layer may perform reordering to compensate for out-of-order reception due to HARQ operation in the MAC layer. There may be one RLC entity per radio bearer.

Figure 3:
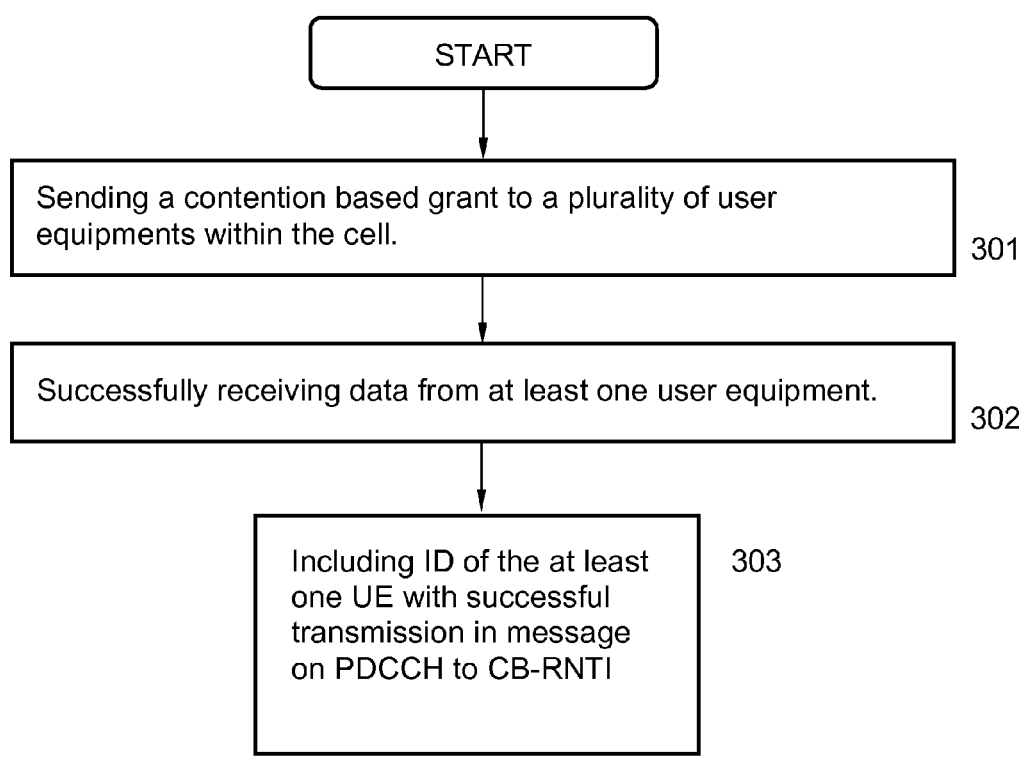
FIG. 3 is a flow chart illustrating embodiments of a method in a base station.

FIG. 3 is a flow chart illustrating embodiments of method steps 301-303 performed in a base station 110 for providing feedback to user equipments 120, 122 in a cell 130 concerning the reception status of data received from the user equipments 120, 122. The base station 110 and the user equipments 120, 122 are comprised in a wireless communication system 100 adapted for contention based transmissions. The base station 110 is adapted to serve a plurality of user equipments 120, 122 within the cell 130. The wireless communication system 100 may be e.g. a LTE radio network and the base station 110 may be e.g. an evolved node B, eNB, according to some embodiments. In step 301 the base station sends a contention based grant to a plurality of user equipments in the cell 130. The contention based grant is assigned to one or multiple common identifiers, referred to as CB-RNTIs, and are accessible by user equipments that are capable of contention based access. In case data is successfully received in step 302 from at least one user equipment 120, an indication of the identity of said at least one user equipment 120 is included, 303, in a message transmitted on the physical downlink control channel assigned to said one or multiple CB-RNTIs.

The message may be a contention based grant, or alternatively, a message with no grant associated to it.

Figure 4A:
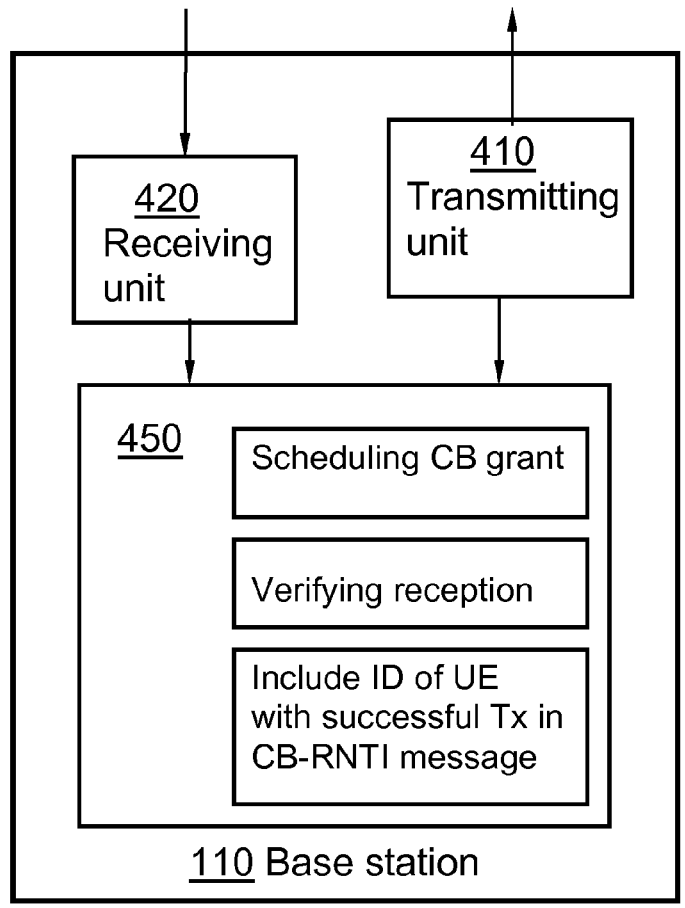
FIG. 4a is a schematic block diagram illustrating embodiments of an arrangement in a base station.

FIG. 4a shows schematically an embodiment of an arrangement in the base station 110. The arrangement comprises a transmitting unit 410 capable of transmitting data and control signaling to a plurality of user equipments 120, 122, a receiving unit 420 capable of receiving signaling from said plurality of user equipments 120, 122. The arrangement furthermore comprises a processing unit 450 configured to schedule contention based grants, verifying reception of data received from user equipments using said contention based grants and upon successful reception of data from at least one user equipment, providing dedicated acknowledgement feedback by including an indication of the identity of said at least one user equipment from which data was successfully received in a message addressed to said common identifier on the physical downlink control channel.

Figure 4B:
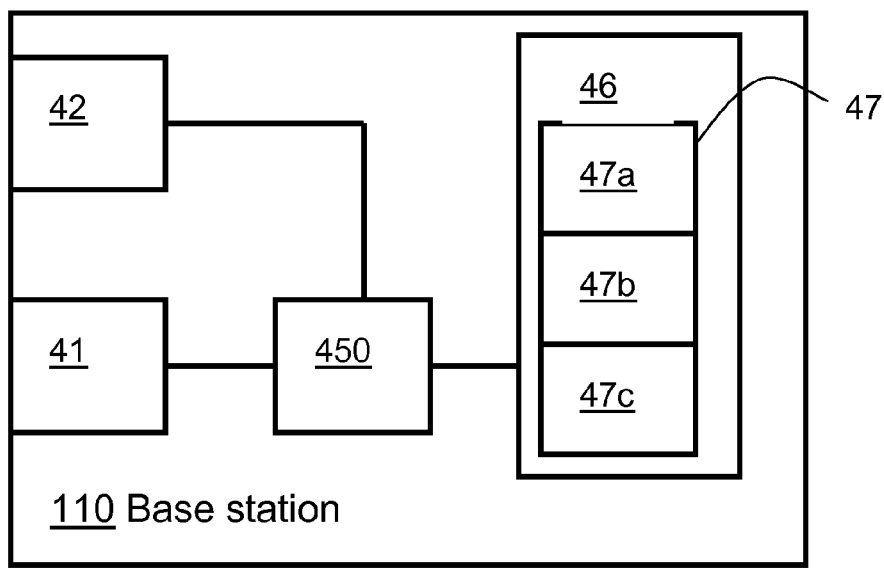
FIG. 4b is an alternative way of disclosing an embodiment of the arrangement in the base station.

FIG. 4b shows schematically an embodiment of the arrangement in the base station 110, which also can be an alternative way of disclosing an embodiment of the arrangement in the base station 110 illustrated in FIG. 4a. Comprised in the arrangement are here a processing unit 450 e.g. with a Digital Signal Processor (DSP) and an encoding and a decoding module. The processing unit 450 can be a single unit or a plurality of units to perform different steps of procedures described herein. The arrangement in the base station 110 furthermore comprises an output unit 41 corresponding to the transmitting unit 410 in FIG. 4a and an input unit 42 corresponding to the receiving unit 420 in FIG. 4a. The input unit 42 and the output unit 41 may be arranged as separate units or as one single unit in the hardware of the arrangement in the base station 110.

Furthermore the arrangement in the base station 110 comprises at least one computer program product 46 in the form of a non-volatile memory, e.g. an Electrically Erasable Programmable Read-Only Memory (EEPROM), a flash memory and a disk drive. The computer program product 46 comprises a computer program 47, which comprises code means which when run on the processing unit 450 causes the arrangement to perform the steps of the procedures described earlier in conjunction with FIGS. 3 and 4a.

Hence in the exemplary embodiments described, the code means in the computer program 47 comprises a module 47a for scheduling of contention based grants, a module 47b for verifying correct reception of data from the plurality of user equipments and a module 47c for including an indication of the identity of one or more user equipments from which data was successfully received. The modules 47 a-c essentially perform the steps of the flow illustrated in FIG. 3 to emulate the device described in FIG. 4a.

Although the code means in the embodiment disclosed above in conjunction with FIG. 4b are implemented as computer program modules which when run on the processing unit 450 causes the processing unit to perform steps described above in the conjunction with FIG. 3, at least one of the code means may in alternative embodiments be implemented at least partly as hardware circuits.

Figure 5:
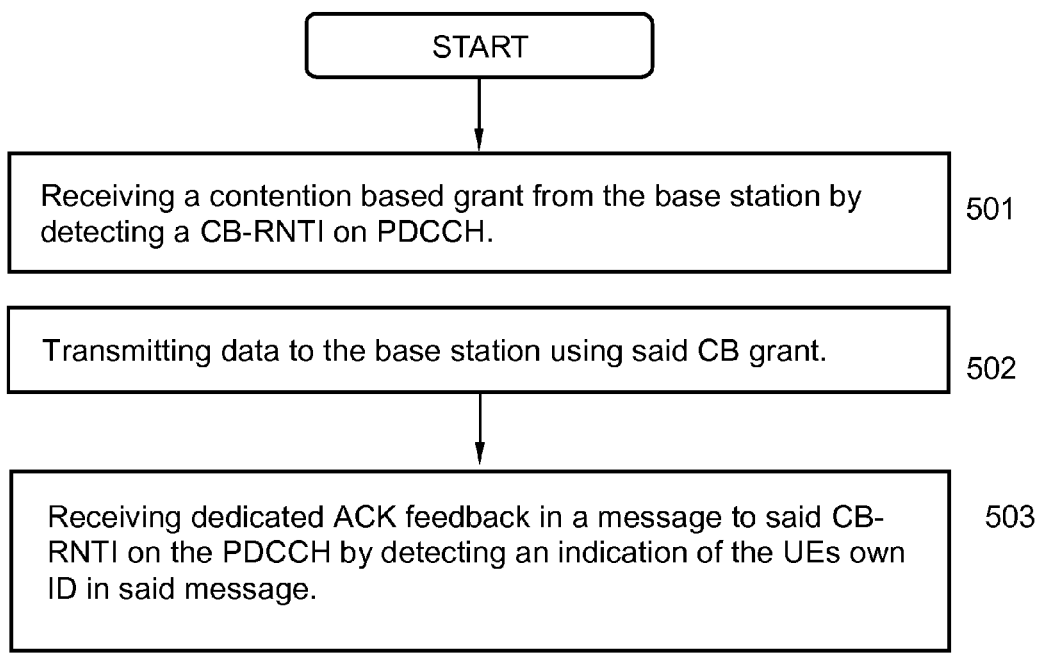
FIG. 5 is a flow chart illustrating embodiments of a method in a user equipment.

FIG. 5 is a flow chart illustrating embodiments of method steps 501-503 performed in a user equipment 120 for receiving feedback from a base station 110. The feedback to be received from the base station 110 concerns the reception status of data sent to the base station 110. The base station 110 and the user equipment 120 are comprised in a wireless communication system 100. The wireless communication system 100, the base station 110 and the user equipment 120 are adapted for contention based transmissions. The base station 110 is adapted to serve a plurality of user equipments 120, 122 within a cell 130. The wireless communication system 100 may be e.g. a LTE radio network and the base station 110 may be e.g. an evolved node B, eNB.

In step 501, a contention based grant assigned to the common identifier, CB-RNTI, is received from the base station 110 by detection of a CB-RNTI on the physical downlink control channel, PDCCH. In step 502, data is transmitted using the contention based grant. In step 503, dedicated acknowledgement feedback is received in a message addressed to the CB-RNTI by detecting an indication of the user equipments own identity in said message.

Figure 6A:
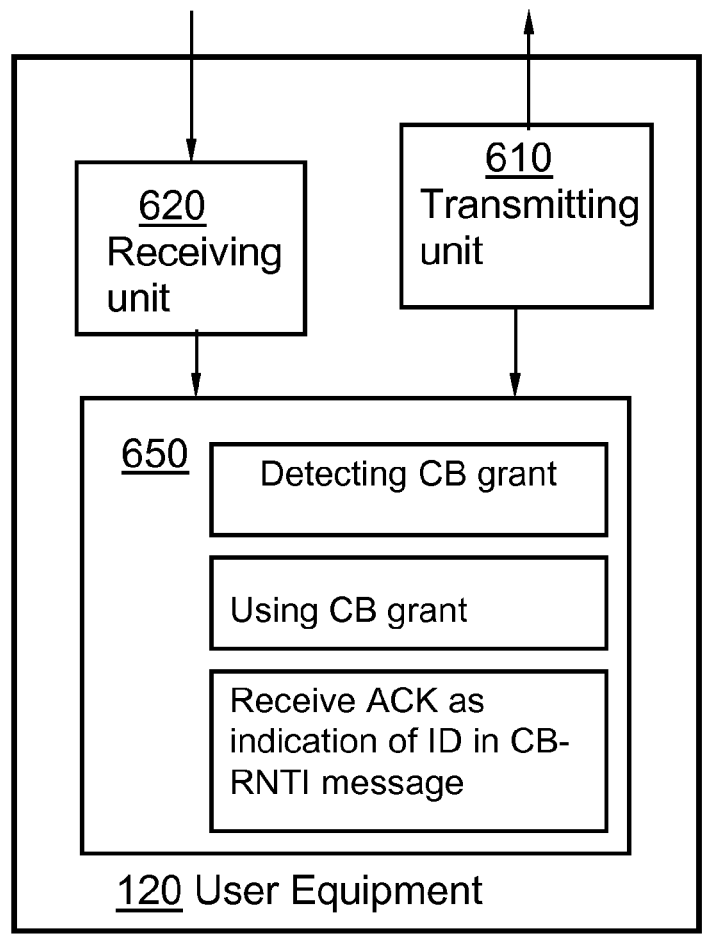
FIG. 6a is a schematic block diagram illustrating embodiments of a user equipment arrangement.

FIG. 6a schematically illustrates an arrangement in a in a user equipment 120. The arrangement is adapted to perform the method steps 501-503. The arrangement comprises a transmitting unit 610 capable of transmitting data and control signaling to a base station, a receiving unit 620 capable of receiving signaling from a base station. The arrangement furthermore comprises a processing unit 650 configured to detect contention based grants, using a contention based grant for transmission of data and receiving dedicated acknowledgement feedback by detecting an indication of the user equipments own identity in a message addressed to said common identifier, CB-RNTI, on the physical downlink control channel.

Figure 6B:
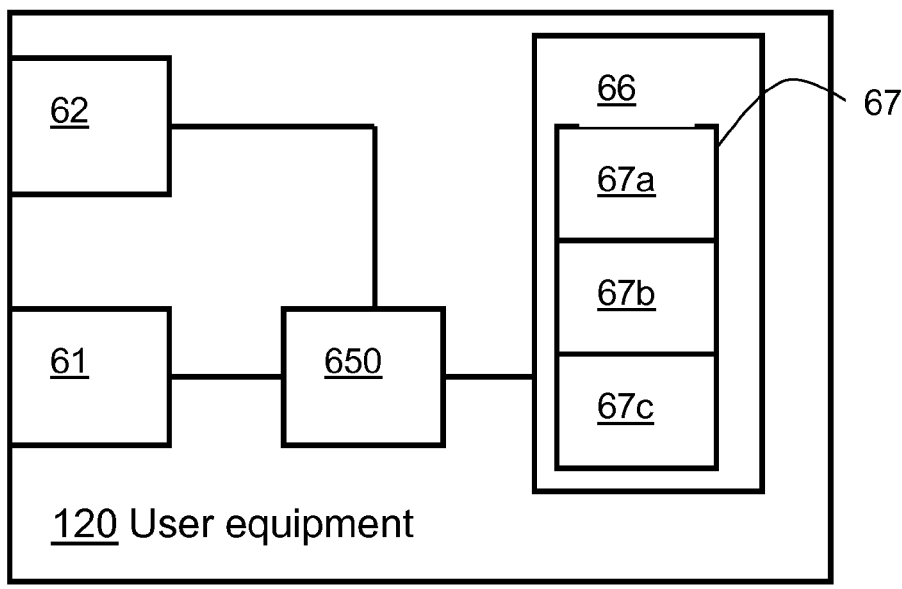
FIG. 6b is an alternative way of disclosing an embodiment of the arrangement in the user equipment.

FIG. 6b shows schematically an embodiment of the arrangement in the user equipment 120, which also can be an alternative way of disclosing an embodiment of the arrangement in the user equipment 120 illustrated in FIG. 6a. Comprised in the arrangement are here a processing unit 650 e.g. with a Digital Signal Processor (DSP) and an encoding and a decoding module. The processing unit 650 can be a single unit or a plurality of units to perform different steps of procedures described herein. The arrangement in the user equipment 120 furthermore comprises an output unit 61 corresponding to the transmitting unit 610 in FIG. 6a and an input unit 62 corresponding to the receiving unit 620 in FIG. 6a. The input unit 62 and the output unit 61 may be arranged as separate units or as one single unit in the hardware of the arrangement in the user equipment 120.

Furthermore the arrangement in the user equipment 120 comprises at least one computer program product 66 in the form of a non-volatile memory, e.g. an Electrically Erasable Programmable Read-Only Memory (EEPROM), a flash memory and a disk drive. The computer program product 66 comprises a computer program 67, which comprises code means which when run on the processing unit 650 causes the arrangement to perform the steps of the procedures described earlier in conjunction with FIGS. 5 and 6a.

Hence in the exemplary embodiments described, the code means in the computer program 67 comprises a module 67a for detecting contention based grants, a module 67b for using a contention based grant for transmission and a module 67c for receiving dedicated acknowledgement feedback by detecting an indication of the user equipments own identity in a message addressed to said common identifier, CB-RNTI, on the physical downlink control channel. The modules 67 a-c essentially perform the steps of the flow illustrated in FIG. 5 to emulate the device described in FIG. 6a.

Although the code means in the embodiment disclosed above in conjunction with FIG. 6b are implemented as computer program modules which when run on the processing unit 650 causes the processing unit to perform steps described above in the conjunction with FIG. 5, at least one of the code means may in alternative embodiments be implemented at least partly as hardware circuits.

For implementing method and arrangements according to embodiments of the invention, different message formats may be applied. In the following, an embodiment is described where one general grant format available for contention based access is used for implementing the invention.

According to this embodiment, there is one contention based grant format available that consists of two main information fields, namely resource allocation field and ACK field. The size and coding of each resource allocation may be fixed or it may alternatively be signaled some other way, for example, broadcasted or through MAC signaling.

In this example, two ACK fields are available of six bits each giving an indication of the identity of the acknowledged user equipment. This indication may for example consist of the least significant bits of the RNTI of the acknowledged user equipment. As previously mentioned, a specific value, here represented by said six bits may be used to indicate a non acknowledgement, NACK. In this example, a NACK is indicated by all six bits set to zeros. Thus, this value is in this example reserved for indicating that no data was received from any user equipment. A user equipment with all zeros as least significant bits may be represented by all ones, such that the value all ones indicate that data is received from a user equipment with least significant C-RNTI bits of either zeros, or ones. Thus, another value could be used to signal an ACK to such user equipment. The message format may optionally comprise a 'More ACKs flag' which is set to notify the user equipments that there will be more ACKs signaled in the next TTI if the number of correctly received contention based transmissions is higher than the number of ACK fields. In this example, the 'More ACKs flag' is set if there are more than two correctly received contention based transmissions.

For resource allocation of the contention based resource, the Type 0 allocation format defined for downlink (DL) assignments may be used. It consists of a bitmap, where each bit corresponds to P resource elements. The value of P depends on the bandwidth. For example, with 5 MHz bandwidth, P is 3, and the bitmap 9 bits long. The bitmap can represent several allocations. Each allocation is given by a group of bits in the bitmap, where the group consists of one or more bits. The number of bits used for a group is either fixed, or signaled some other way, for example, broadcasted or through MAC signaling.

An example of a general contention based grant format available for contention based access used to implement an embodiment of the invention is shown in Table 1 below:

TABLE 1

Fields in UL grants, Number of resource blocks = 25

| Information field | Suggested size in CB grant [bit] |
|---|---|
| Hopping flag | 1 |
| Resource elements (as in Type 0) | 9 |
| ACK 1 | 6 |
| ACK 2 | 6 |
| More ACKs flag | 1 |
| CRC | 16 |
| Total size | 39 |

The fields comprised in the uplink grant according to the particular embodiment shown in Table 1 are thus a hopping flag, which is used to indicate whether frequency hopping is used or not, the resource elements represented by the bitmap described in the foregoing, two ACK fields for indicating the identity of a first and second acknowledged user equipment, a "more ACKs flag" as previously described and a CRC, Cyclic Redundancy Check" field, which is a bit string used to verify that the transmission is correctly decoded.

According to yet an embodiment of the invention, several new PDCCH formats could be defined for contention based access, and the size of the control message indicates to the user equipment what format is used.

Examples of formats that could be defined are:
A combined grant and ACK format similar to the example in Table 1
A semi-persistent grant that allocates a part of the spectrum for a longer period of time.
A basic contention based grant, see column "CB grant" in Table 2.
A format with only one ACK and no grant, see column 'Small ACK' in Table 2.
A format with several ACK's and no grant. See column "Large ACK" in Table 2, where the number of ACK's included is given by a field 'Nr of ACK'. The ACK field is then used to give the identity of N user equipment's with correctly received data. The number of bits used for each ACK is given by the size of the ACK field divided by N. If there is one ACK, the whole field is used for the least significant bits of the C-RNTI of that user equipment, and if there are more, the ACK field is divided into several sub-fields representing the identity of each user equipment.

Hereby, the message formats that do not contain an ACK field, such as the semi-persistent grant and the basic contention based grant above, can be applied when there is no ACK to report in order to save resources, while any of the formats that contain one or more ACK field is selected for providing dedicated feedback. Which format that should be used depends for example on the number of ACKs to be reported and if the user equipments require another grant.

TABLE 2

Suggested fields in CB PDCCH formats, Number of resource blocks = 25

| Information field | CB grant [bit] | Small ACK [bit] | Large ACK [bit] |
|---|---|---|---|
| Hopping flag | 1 | 0 | 0 |
| Resource elements (as in Type 0) | 9 | 0 | 0 |
| Nr of ACK (binary, starting at 1) | 0 | 0 | 2 |
| ACK | 0 | 6 | 12 |
| CRC | 16 | 16 | 16 |
| Total size | 26 | 22 | 30 |

The present invention may, of course, be carried out in other ways than those specifically set forth herein without departing from essential characteristics of the invention. The present embodiments are to be considered in all respects as illustrative and not restrictive.

The invention claimed is:

1. A method in a base station for providing feedback to a plurality of user equipments on reception status of data transmitted by the plurality of user equipments, the base station and the plurality of user equipments being comprised in a wireless communication system adapted for contention based transmissions, wherein a common identifier that identifies the plurality of user equipments is used to identify contention based grants on a physical downlink control channel, the method comprising:
   sending a first contention based grant to the plurality of user equipments, wherein the plurality of user equipments is identified by the common identifier;
   upon successful reception of data from at least one of the plurality of user equipments identified by the common identifier in response to the first contention based grant, providing dedicated acknowledgement feedback, by including an indication of an identity of the at least one of the plurality of user equipments from which data was successfully received, in a message addressed to the same common identifier as used in the first contention based grant on the physical downlink control channel, wherein the message addressed to the common identifier that includes the dedicated acknowledgement feedback is a second contention based grant that is transmitted on the physical downlink control channel, wherein the second contention based grant comprises a resource allocation field and at least one acknowledgement, ACK, field, and wherein the at least one ACK field comprises an indication of the identity of the at least one of the plurality of user equipments comprising a plural number of bits;
   sending a third contention based grant to the plurality of user equipments; and
   upon receiving no data from any of the plurality of user equipments in response to the third contention based grant, transmitting a fourth contention based grant that is transmitted on the physical downlink control channel and addressed to the common identifier, the fourth contention based grant comprising at least one ACK field comprising a special value that is reserved to indicate that no data was received comprising the same plural number of bits as the ACK field of the second contention based grant.

2. The method according to claim 1, wherein the second contention based grant comprises two or more acknowledgement, ACK, fields for acknowledging identities of two or more user equipments from which data was successfully received.

3. The method according to claim 1, wherein the message comprises a field indicating if additional dedicated acknowledgements will be signaled in a following Transmission Time Interval, TTI.

4. The method according to claim 1,
wherein the at least one ACK field comprises the indication of the identity of the at least one of the plurality of user equipments, and
wherein the indication of the identity of the at least one of the plurality of user equipments comprises a subset of bits of a C-RNTI of the at least one of the plurality of user equipments from which data was successfully received.

5. The method according to claim 4, wherein the indication of the identity of the at least one of the plurality of user equipments is represented in the message by a number of the least significant bits of the C-RNTI of the at least one of the plurality of user equipments from which data was successfully received.

6. An arrangement in a base station adapted to provide feedback to a plurality of user equipments on reception status of data transmitted by the plurality of user equipments, the base station and the plurality of user equipments being comprised in a wireless communication system adapted for contention based transmissions, wherein a common identifier that identifies the plurality of user equipments is used to identify contention based grants on a physical downlink control channel, the arrangement comprising a processing unit configured to:
send a first contention based grant to the plurality of user equipments, wherein the plurality of user equipments is identified by the common identifier;
upon successful reception of data from at least one of the plurality of user equipments identified by the common identifier in response to the first contention based grant, provide dedicated acknowledgement feedback by including an indication of an identity of the at least one of the plurality of user equipments from which data was successfully received in a message addressed to the same common identifier as used in the first contention based grant on the physical downlink control channel, wherein the message addressed to the common identifier that includes the dedicated acknowledgement feedback is a second contention based grant that is transmitted on the physical downlink control channel, wherein the second contention based grant comprises a resource allocation field and at least one acknowledgement, ACK, field, and wherein the at least one ACK field comprises an indication of the identity, of the at least one of the plurality of user equipments comprising a plural number of bits;
send a third contention based grant to the plurality of user equipments; and
upon receiving no data from any of the plurality of user equipments in response to the third contention based grant, transmit a fourth contention based grant that is transmitted on the physical downlink control channel and addressed to the common identifier, the fourth contention based grant comprising at least one ACK field comprising a special value that is reserved to indicate that no data was received comprising the same plural number of bits as the ACK field of the second contention based grant.

7. A method in a first user equipment for receiving feedback from a base station on reception status of data transmitted by the first user equipment, the base station and the first user equipment being comprised in a wireless communication system adapted for contention based transmissions, wherein a common identifier that identifies a plurality of user equipments including the first user equipment is used to identify contention based grants on a physical downlink control channel, the method:
receiving a first contention based grant transmitted by the base station to the plurality of user equipments, wherein the plurality of user equipments is identified by the common identifier;
transmitting first data using the first contention based grant; and
receiving dedicated acknowledgement feedback by detecting an indication of an identity of the first user equipment in a message on the physical downlink control channel addressed to the same common identifier as used in the first contention based grant, wherein the message addressed to the common identifier that includes the dedicated acknowledgement feedback is a second contention based grant that is transmitted on the physical downlink control channel, wherein the second contention based grant comprises a resource allocation field and at least one acknowledgement, ACK, field, and wherein the at least one ACK field comprises an indication of the identity of the at least one of the plurality of user equipments comprising a plural number of bits;
receiving a third contention based grant transmitted by the base station to the plurality of user equipments;
transmitting second data using the third contention based grant;
receiving a fourth contention based grant on the physical downlink control channel and addressed to the common identifier;
determining that the fourth contention based grant comprises at least one ACK field comprising a special value that is reserved to indicate that no data was received comprising the same plural number of bits as the ACK field of the second contention based grant; and
retransmitting the second data responsive to the determining that the fourth contention based grant comprises the at least one ACK field comprising the special value that is reserved to indicate that no data was received.

8. The method according to claim 7, wherein the second contention based grant comprises two or more acknowledgement, ACK, fields for acknowledging identities of two or more user equipments from which data was successfully received.

9. The method according to claim 7, wherein the message comprises a field indicating if additional dedicated acknowledgements will be signaled in a following Transmission Time Interval, TTI.

10. The method according to claim 7,
wherein the at least one ACK field comprises the indication of the identity of the at least one of the plurality of user equipments, and
wherein the indication of the identity of the first user equipment comprises at least a part of a C-RNTI of the first user equipment from which data was successfully received.

11. The method according to claim 10, wherein the indication of the identity of the first user equipment is represented in the message by a number of the least significant bits of the C-RNTI of the first user equipment from which data was successfully received.

12. An arrangement in a first user equipment adapted to receive feedback from a base station on reception status of data transmitted by the first user equipment, the base station and the first user equipment being comprised in a wireless communication system adapted for contention based transmissions, wherein a common identifier that identifies a plurality of user equipments including the first user equipment is used to identify contention based grants on a physical downlink control channel, the arrangement comprising a processing unit configured to:

receive a first contention based grant transmitted by the base station to the plurality of user equipments, wherein the plurality of user equipments is identified by the common identifier;

transmit first data using the first contention based grant;

receive dedicated acknowledgement feedback by detecting an indication of an identity of the first user equipment in a message on the physical downlink control channel addressed to the same common identifier as used in the first contention based grant, wherein the message addressed to the common identifier that includes the dedicated acknowledgement feedback is a second contention based grant that is transmitted on the physical downlink control channel, wherein the second contention based grant comprises a resource allocation field and at least one acknowledgement, ACK, field, and wherein the at least one ACK field comprises an indication of the identity of the at least one of the plurality of user equipments comprising a plural number of bits;

receive a third contention based grant transmitted by the base station to the plurality of user equipments;

transmit second data using the third contention based grant;

receive a fourth contention based grant on the physical downlink control channel and addressed to the common identifier;

determine that the fourth contention based grant comprises at least one ACK field comprising a special value that is reserved to indicate that no data was received comprising the same plural number of bits as the ACK field of the second contention based grant; and retransmit the second data responsive to the determining that the fourth contention based grant comprises the at least one ACK field comprising the special value that is reserved to indicate that no data was received.

* * * * *